Patented Aug. 14, 1945

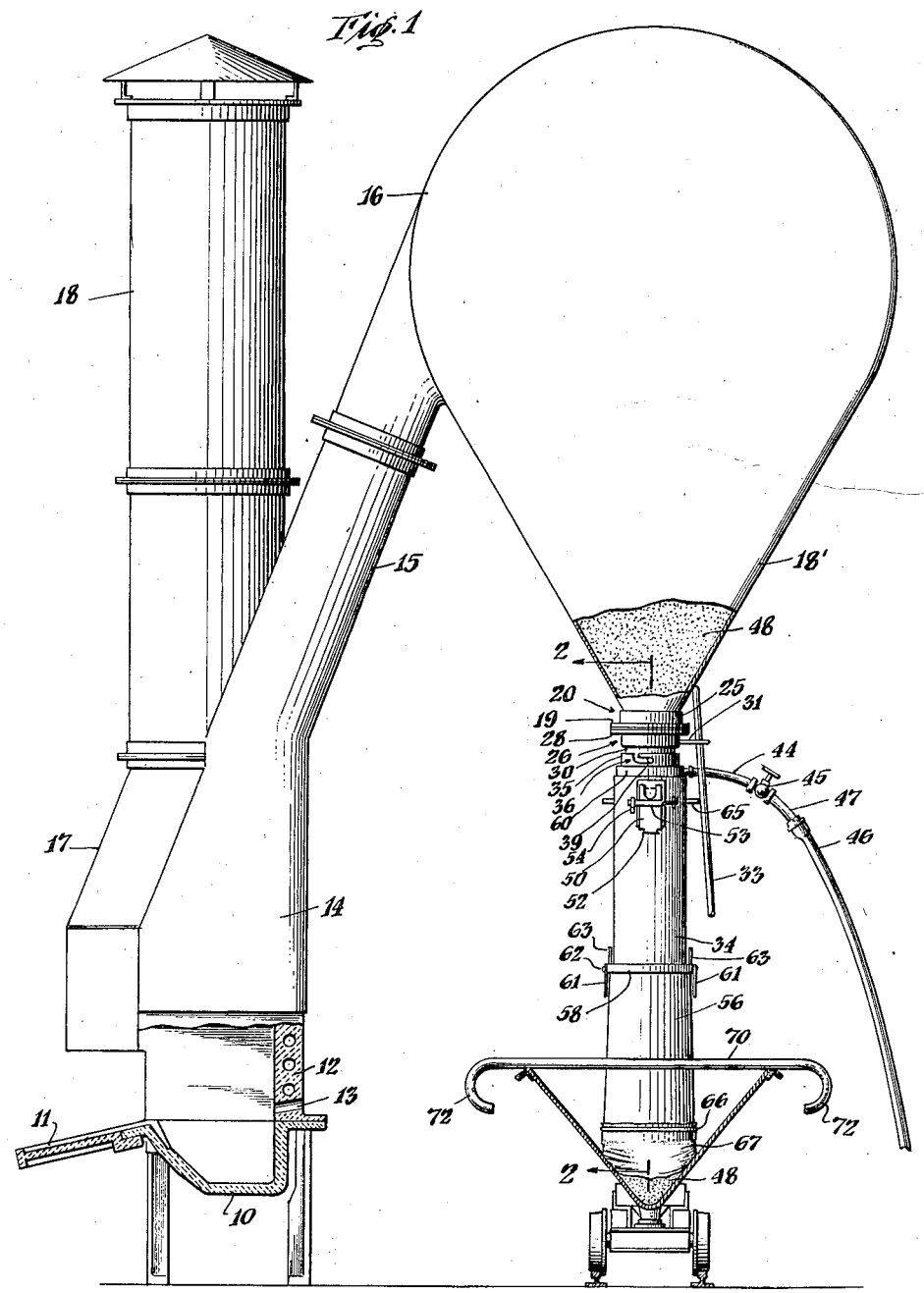

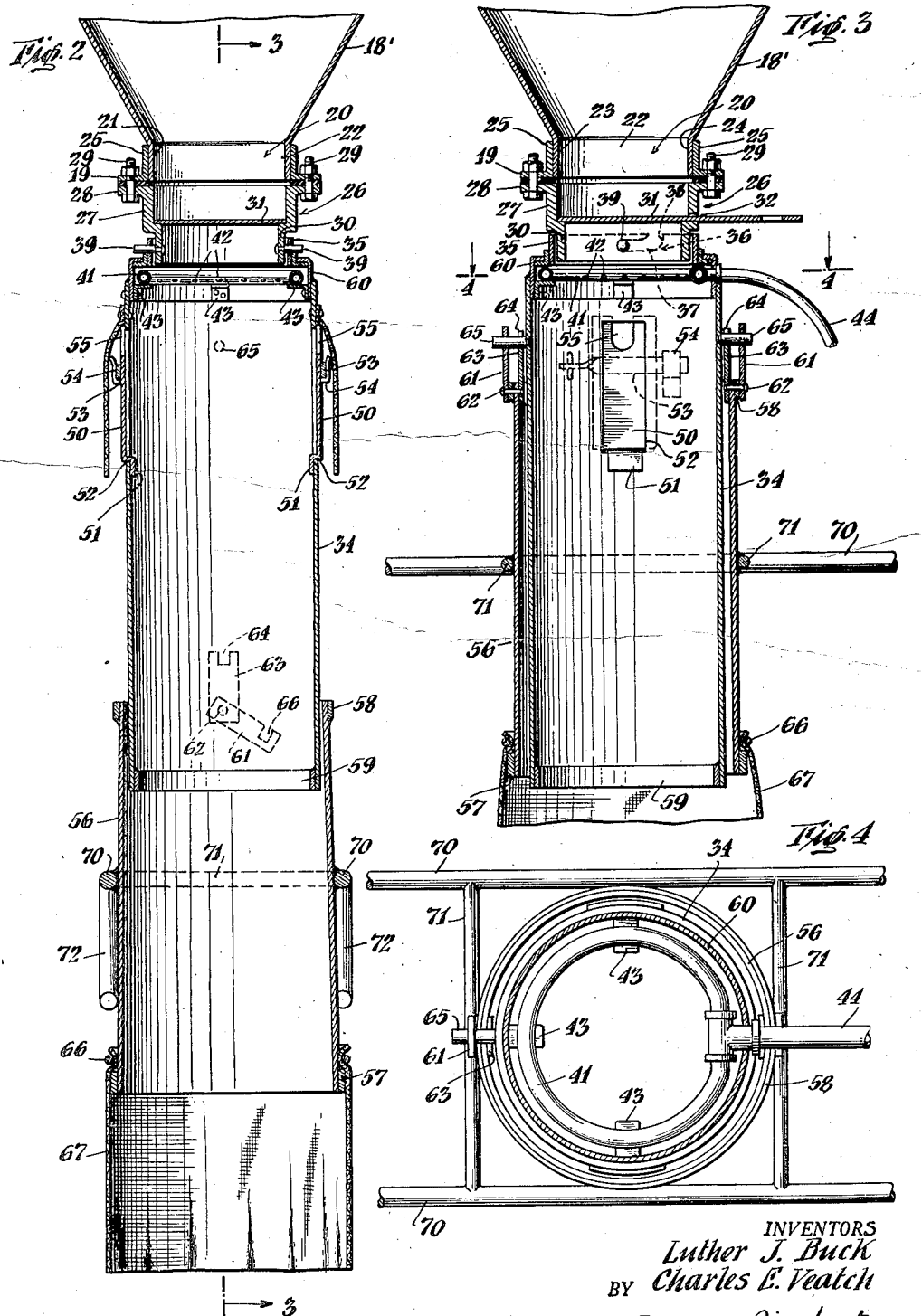

2,382,855

UNITED STATES PATENT OFFICE 2,382,855

APPARATUS FOR FLUE DUST REMOVAL

Luther J. Buck and Charles E. Veatch, Alton, Ill., assignors to American Smelting and Refining Company, New York, N. Y., a corporation of New Jersey Application February 11, 1943, Serial No. 475,588

4 Claims. (Cl. 266—15)

This invention relates to apparatus for removal of dust from the flues of metallurgical furnaces, more particularly from the balloon flues of furnaces of the Scotch-hearth type.

In this country the Scotch-hearth furnace is used for smelting certain types of lead ores. Conventionally, a furnace of this type comprises a narrow, relatively shallow trough or basin of some length having a flat sloping apron at its front and a liquid cooled jacket extending substantially vertically at its rear forming a back for the hearth. Suitable tuyères are provided for introducing air to the charge in the trough, the charge of ore being provided with a carbonaceous material if necessary to provide combustible to produce the necessary heat to smelt the charge. The trough in which the charge is smelted is covered with a hood which is connected by suitable conduits to a relatively large "balloon flue" into which the products of combustion from the charge in the trough are carried. (For a more detailed discussion of smelting of ores in a Scotch-hearth, see paper by L. J. Buck, 121 Trans. A. I. M. E. 106, 1936.)

In the operation of the Scotch-hearth furnace of this type, the balloon flue is maintained under a slight vacuum or suction; it being common to provide a vacuum of the order of one inch of water. Hence, the products of combustion from the charge in the trough are carried into the balloon flue. With these products of combustion there is carried a quantity of dust from the charge. This dust which includes recoverable metal values, collects in the balloon flue and more generally in hoppers along the flue, and is removed therefrom from time to time. It is afterwards treated to recover the metal values. To this end, it is common practice to mix the collected dust with the charge and in that way it is returned to the process. In some instances, the dust may be otherwise handled and treated. But, in any event, the removal of the dust from the flue and its subsequent handling has presented a somewhat perplexing problem. Losses in many instances have been appreciable, and the workmen having the task of removing and handling the dust have not taken well to this work, not alone because it is arduous but also because of lack of means to prevent the dust's flying about in the vicinity where they must labor. Obviously, air contaminated with dust is conducive to a condition hazardous to their health.

In accordance with this invention, there is provided apparatus which may be utilized in combination with the conventional Scotch-hearth type of furnace to facilitate the removal of dust deposited in the balloon flue. The dust may be collected without appreciable loss and without undue "flying about" of dust particles in the air. At the same time, the dust may, if desired, be collected in a moist condition which is a desirable aid in further rehandling, or storage, or in further treatment of the dust to recover the metal values therefrom.

According to a preferred embodiment of the invention, there is provided a sectional telescopic sleeve constructed so that it may, by means of a slotted ring engaging studs on the outlets of the hopper, be readily attached to and detached from the various hoppers along the balloon flue. The bottom end of the lower sleeve mounts a readily replaceable canvas skirt for purposes of providing a dust seal, and in the top end of the upper sleeve there is provided a suitable spray pipe through which a regulated quantity of water is sprayed as the dust is drawn from the hopper. The lower sleeve mounts handles by means of which this sleeve may be gradually raised as the dust begins to fall. Thus, for example, a tip or dump car which is ordinarily used to transport the dust about the plant, may be placed under a hopper and gradually filled while maintaining the canvas skirt in effective sealing engagement with the surface of the pile of dust as it fills the car. The ends of these handles are suitably shaped to facilitate lifting the device above the heads of the workmen without undue effort or stretch. The upper sleeve has a hinged door on either side through which a bar or hoe or other suitable tool may be inserted to dislodge or rake down dust from the flue that does not readily flow.

After a car is filled with dust or when it is desired to move the device to another hopper, the lower sleeve may be raised to its maximum height and locked to the upper sleeve by means of suitable latches. In this position the upper sleeve and consequently the telescopic sleeve may be readily detached from the hopper and moved to another hopper where it is used in the same manner.

Although the novel features which are believed to be characteristic of this invention are more particularly pointed out in the claims appended hereto, the invention itself, as to its objects and advantages, and the manner in which it may be constructed or carried out may be better understood by referring to the following description taken in connection with the accompanying drawings forming a part thereof, in which:

Fig. 1 is a view in elevation, partly in section, showing an embodiment of the invention;

Fig. 2 is a view in cross section on line 2—2 of Fig. 1, but on a larger scale;

Fig. 3 is a view in cross section on line 3—3 of Fig. 2, the lower sleeve, however, being shown in its uppermost position.

Fig. 4 is a view on line 4—4 of Fig. 3.

Referring to the drawings, in which like reference characters denote like parts throughout the several figures, 10 represents the smelting basin or trough of a Scotch-hearth type of furnace. It is provided with a sloping apron 11 at its front and a vertically disposed, water-cooled jacket 12 forming a back wall. Tuyères 13 are provided along the back wall. It will be understood that these parts are shown more or less conventionally. The trough 10 is covered with a main hood 14 connected by means of a suitable conduit 15 to the balloon flue 16. Conduit 15 carries the products of combustion or fume from the trough into the flue. A ventilating hood 17 connected to stack 18 is mounted over the apron 11.

The balloon flue 16 is provided with a funnel-shaped hopper 18' which terminates in a preferably square or rectangular-shaped discharge outlet designated generally by reference numeral 20. The outlet 20 is defined by walls 21, 22, 23, 24 providing a hopper neck around which is fixedly secured a flanged collar 25 having a flange 19. The flanged collar provides means for mounting on the outlet 20 of the hopper 18, an adapter which is designated generally by reference character 26.

The adapter 26 comprises a flanged upper portion 27 provided with a flange 28 which registers with the flange 19 of collar 25. The adapter may be securely attached to the hopper outlet in any desirable manner, as by bolts 29 passing through registering apertures in the flange 19 and the flange 28. The adapter terminates in a circular, downwardly protruding neck portion 30. A gate or slide 31, slidingly movable in a slot 32, provides means for closing off communication between the flue hopper and the outside and also for forming a stop to retain dust collected in the flue at times when the operation of dust removal from the hopper is suspended. The gate may be opened the desired amount for dust removal by moving the slide 31 in and out through the slot 32. If leverage is desired, a level tool 33 may extend through the outer end of the slide.

The top end of an upper discharge sleeve 34 terminates in a slotted ring 35 forming a collar to register with and fit over the downwardly protruding neck portion 30 of the adapter 26. The slots 36 of which there are two shown, spaced 180° apart, have a horizontal portion 37 and a vertical portion 38 which provides passageway for studs 39 secured to the neck 30 of the adapter. These studs are spaced 180° apart so as to register with the slots 36. It will now be observed that the slotted ring 35 may be readily attached to the neck of the adapter 26 by registering the studs with the vertical portion of the slots and lifting the ring while giving it a part turn so that the studs 39 engage the horizontal portion 37 of the slots. A reverse movement will readily disengage the ring and hence the sleeve 34 from the adapter neck 30.

Mounted in the upper interior portion of the sleeve 34 is an annular spray pipe 41 provided with spray apertures 42. It has been found expedient to locate these openings in such manner that they direct a plurality of streams of liquid inwardly at about 15° from the horizontal. The spray pipe 41 may be mounted on brackets 43 fixed to the interior surface of the sleeve 34. The annular spray pipe 41 is suitably connected with a nipple 44 to a valve 45 which may be connected by means of a nipple 47 to a disengageable flexible water hose 46.

The upper sleeve 34 is also provided with a door 50 on either side. The door is suitably hinged at the bottom by merely offsetting an extended tongue 51 which will extend through the opening 52 in the wall of the sleeve 34 and rest on the bottom edge of the opening as shown in Figs. 2 and 3. The door is slightly larger in area than the opening 52 and may be locked against the sleeve by means of a hinged hasp 53 adapted to register with a keeper 54. The upper end of the door 50 is provided with a small aperture 55 to accommodate a hoe handle or other tool which may be used in scraping down dust from the flue. If desired, a split, flexible curtain of canvas or heat-resistant cloth may be provided to further seal off this aperture 55 if dust is discharged through the hole in the door.

Concentrically and slidably mounted on upper sleeve 34 in telescopic fashion is a lower discharge sleeve 56. These sleeves may be constructed of comparatively thin gauged metal and reinforced by means of suitable rings such as those shown by reference characters 57, 58, 59 and 60 which may be secured in place, as by welding.

The upper end of the lower sleeve 56 is provided with two latches. Each latch 61 is pivotally mounted on a pivot which may be in the form of a rivet 62 extending through the wall of the sleeve 56. The pivot also securely and fixedly mounts a guide piece 63 which is provided with a notch 64 designed to register with and engage a latch stud 65 secured to the wall of the sleeve 34. Each latch 61 is provided with a notch 66 to engage and hook over its corresponding stud 65. Hence, when the lower sleeve is raised to its uppermost position as shown in Fig. 3, each guide piece 63 engages its corresponding stud 65 and notch 64 registers with it. Latch 61 may be rotated on the pivot 62 and the notch 66 registers with and hooks over its corresponding stud 65 to hold the lower sleeve in raised position. This arrangement prevents rotation of the sleeves relative to one another when in locked position.

Clamped to the lower end of sleeve 56, as by means of a split snap ring 68 is a downwardly extending flexible skirt 67 which may be of canvas or a heat-resistant flexible cloth. The lower sleeve also mounts suitable handles which may be in the form shown, comprising parallel bars or pipes 70 held in spaced relation by reinforcing cross bars 71 which engage the lower sleeve. The ends 72 of the handles may be curved as shown in Fig. 1 to provide means for the workmen to raise the lower sleeve or the entire telescopic sleeve part of the device above their heads without undue stretch.

In describing the operation and use of the invention, it may be assumed, first, that the telescopic sleeves are locked so that the lower sleeve is raised. This device may be lifted so that the vertical slots engage the studs 39 and the ring 35 is given a slight turn so that the telescopic discharge sleeves are secured to the adapter 26. A tip or dump car is moved under the sleeves. The latches 61 are unhooked from the studs 65 and the lower sleeve permitted to move downwardly until the canvas skirt engages the bottom of the bed of the car (see Fig. 1). Slide 31 of the adapter is moved out to open up the hopper outlet. If the dust 48 does not readily flow out of the hopper, a hoe or other tool may be inserted through the door opening 52, the door closed and the dust scraped down. The dust will then readily fall from the hopper opening, through the passageway of the adapter into the discharge conduit and finally into the car. In the meantime a regulated amount of water may, if desired, be fed through the spray pipe 41 to "wet down" the dust to reduce its tendency to fly about. As the car is gradually filled with dust, the lower sleeve 34 is progressively raised, it being preferable to maintain the flexible skirt 67 in engagement with the surface of the pile of dust to obtain the effect of a dust seal. In this manner, the dust is kept under control and will not fly about in suspension in the ambient air.

After the dust has been removed from the flue, the slide 31 is closed to form a stopper for the flue outlet. The lower sleeve 56 is raised and locked in uppermost position as shown in Fig. 3. Ring 35 is given a partial turn to disengage it from the studs 39. Then the device may be readily carried by the workmen to another hopper where it is attached and used in the same manner as described.

While certain novel features of the invention have been described and are pointed out in the annexed claims, it will be understood that various omissions, substitutions and changes may be made by those skilled in the art without departing from the spirit of the invention.

What is claimed is:

1. In a device of the character described for removal of dust from the flue of a metallurgical furnace, a telescopic dust discharge conduit having an inner and an outer sleeve, said outer sleeve concentrically mounted to slide up and down on said inner sleeve, an upwardly extending ring on the upper end of one of said sleeves, a flexible skirt on the lower end of the other of said sleeves, means to temporarily lock said sleeves to prevent relative movement one with the other, a spray pipe providing means for wetting down dust removed from said flue, and an adapter to connect said discharge conduit to said flue.

2. In a device of the character described for removal of dust from the flue of a metallurgical furnace, a downwardly extending neck having protruding studs thereon, a telescopic dust discharge conduit having an inner and an outer sleeve, said outer sleeve concentrically mounted to slide up and down on said inner sleeve, an upwardly extending ring on the upper end of one of said sleeves and engaging said neck, said ring having a cut-away portion to engage said studs whereby said conduit may be readily attached to and detached from said neck, a flexible skirt on the lower end of the other of said sleeves, means to temporarily lock said sleeves to prevent relative movement one with the other, and a spray pipe to provide means for wetting down dust removed from said flue.

3. A device of the character described which comprises, in combination, a metallurgical furnace having a flue in which dust collects, a dust collecting hopper in said flue, means on said hopper defining a dust removal opening, an adapter secured to said means, said adapter comprising an upper portion engaging said means and a downwardly extending circular neck portion, said portions providing passageway for dust from said opening, a slidable gate in said adapter for opening and closing said passageway, a telescopic discharge conduit having an inner sleeve and an outer sleeve concentrically mounted and slidable on said inner sleeve, a slotted collar on the upper end of said inner sleeve engaging said downwardly extending neck portion, studs on the neck registering with and engaging said slots in said collar whereby the telescopic conduit may be easily attached to and detached from said adapter, and a water spray pipe mounted in said inner sleeve providing means for wetting down dust passing therethrough.

4. A device of the character described which comprises, in combination, a metallurgical furnace having a flue in which dust collects, a dust collecting hopper in said flue, means on said hopper defining a dust removal opening, an adapter secured to said means, said adapter comprising an upper portion engaging said means and a downwardly extending circular neck portion, said portions providing passageway for dust from said opening, a slidable gate in said adapter for opening and closing said passageway, a telescopic discharge conduit having an inner sleeve and an outer sleeve concentrically mounted, said outer sleeve being slidable on said inner sleeve, a slotted collar on the upper end of said inner sleeve engaging said downwardly extending neck portion, studs on the neck registering with and engaging said slots in said collar whereby the telescopic conduit may be easily attached to and detached from said adapter, a water spray pipe mounted in said inner sleeve providing means for wetting down dust passing therethrough, a door mounted on the wall of said inner sleeve for insertion of a tool, latch studs mounted on the wall of said inner sleeve and a latch mounted on said outer sleeve engageable with said latch studs to lock said outer sleeve to prevent relative movement between said two sleeves, a handle for raising said outer sleeve and a flexible skirt mounted on the lower end of said outer sleeve.

LUTHER J. BUCK.
CHARLES E. VEATCH.